UNITED STATES PATENT OFFICE.

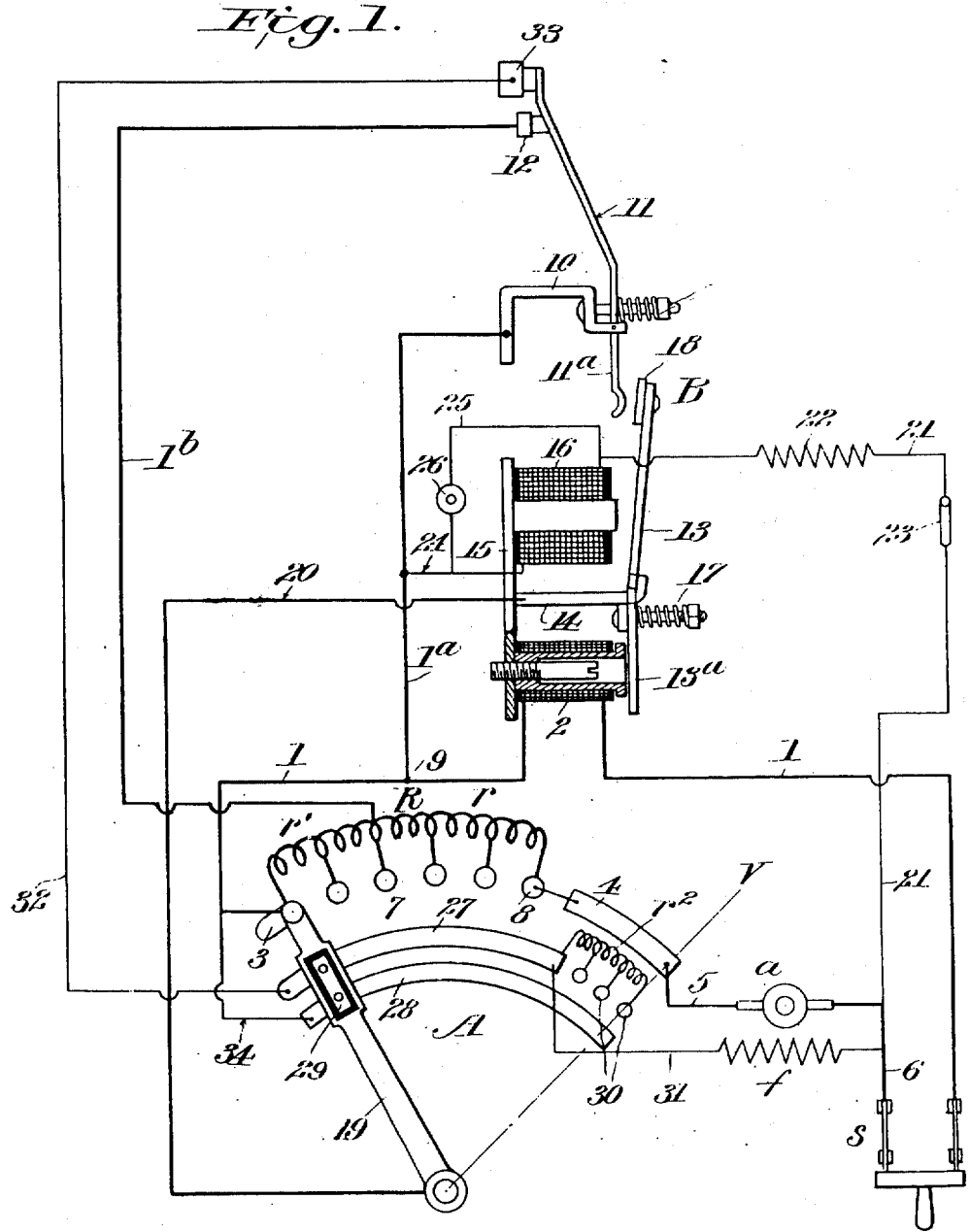

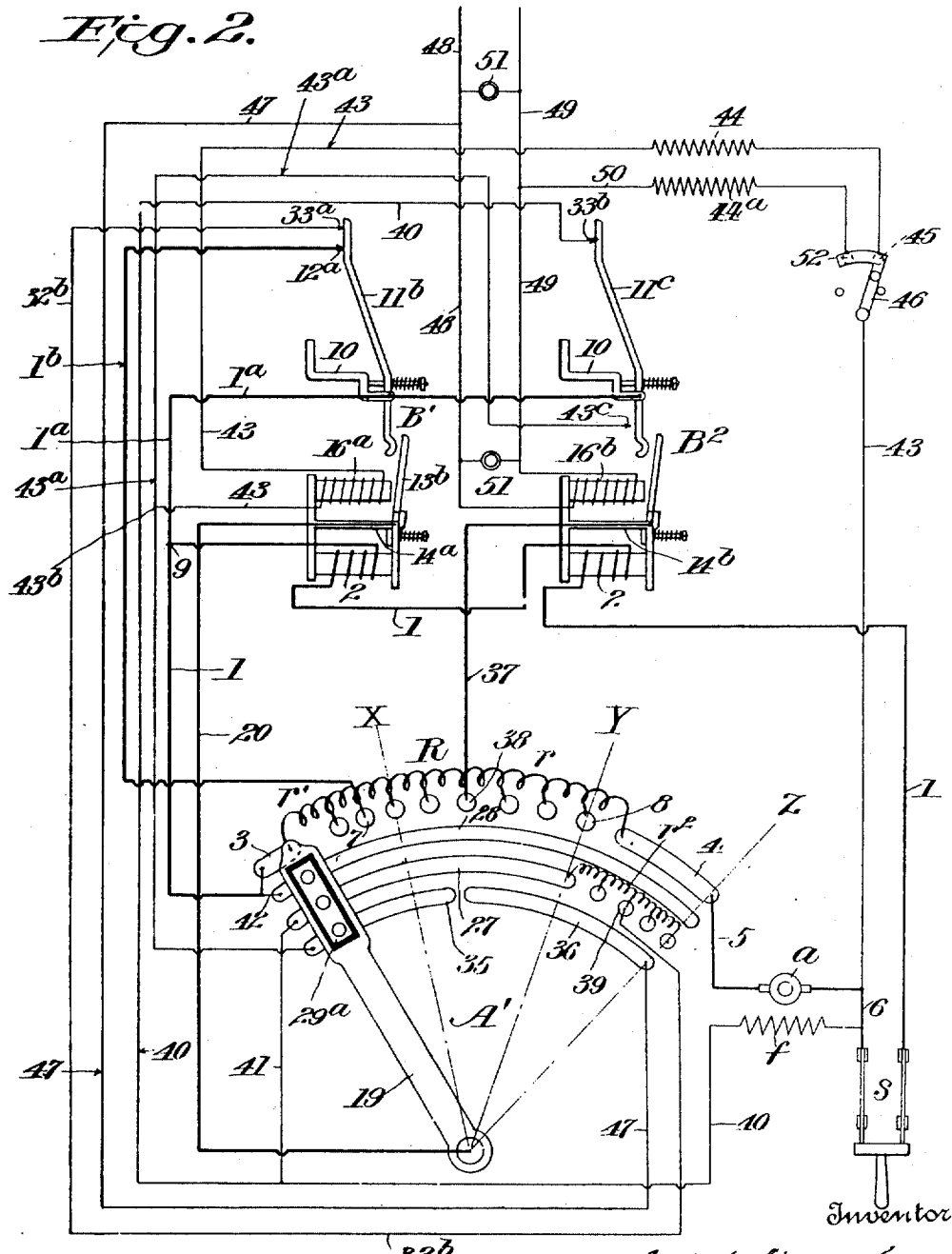

GEORGE H. WHITTINGHAM, OF BANCROFT PARK, MARYLAND, ASSIGNOR TO MONITOR CONTROLLER COMPANY, OF BALTIMORE, MARYLAND, A CORPORATION OF MARYLAND.

CONTROLLER FOR ELECTRIC MOTORS.

1,243,665. Specification of Letters Patent. Patented Oct. 16, 1917.

Application filed November 8, 1915. Serial No. 60,263.

*To all whom it may concern:*

Be it known that I, GEORGE H. WHITTINGHAM, a citizen of the United States, residing at Bancroft Park, in the county of Baltimore and State of Maryland, have invented certain new and useful Improvements in Controllers for Electric Motors, of which the following is a specification.

This invention relates to controllers for electric motors used for driving individual machines, such as certain types of printing presses, which, owing to inertia, require the development of a strong starting torque on the part of the motor, and which also require such a wide range of running speeds that in order to obtain the lowest running speed, a resistance greater than the normal starting resistance is required in the armature circuit for running. A motor of suitable size for operating such a machine at all running speeds will not develop the necessary torque for starting the load promptly if armature resistance in excess of the starting resistance is included in circuit with the motor initially, but this excess resistance may be added after the load has been started. The invention therefore comprises means whereby only the normal starting resistance is included in the armature circuit while the load is being started, and whereby additional armature resistance will be automatically added, after the load has been started, if the machine is to be operated at very low speed, and whereby, if the machine is to be operated at higher speeds, all or any part of the starting resistance will be automatically cut out, and for the highest speeds, resistance will be introduced into the field circuit. It is desirable with this class of machines to be able to slow down or stop the motor and driven machine, at times, and upon speeding up or starting the motor again to have it operate the machine at the same pre-set speed as before, and these functions are also accomplished by the controller of the present invention.

The construction and operation of the controller will be clear from the following specification, taken in connection with the accompanying drawing, in which, Figure 1 is a diagrammatic view illustrating a controller, having in the armature circuit a starting resistance and an additional resistance, in which all of the starting resistance is retained in the armature circuit, and the additional resistance is excluded, while the motor is starting its load, and the entire armature resistance, or any lesser amount will be retained, or the entire resistance will be cut out, automatically, after the load has been started, according to the position of a pre-set speed controlling member; and, Fig. 2 is a similar view illustrating a similar controller in which a part of the starting resistance is cut out during the starting operation, when the speed controlling member is set for the higher running speeds and in which all of said resistance is retained in circuit while starting when said member is set for the lower running speeds.

Referring to Fig. 1, M indicates the motor to be controlled, comprising the armature $a$ and shunt field $f$, and S indicates the switch for connecting the motor with the supply circuit. The controller comprises a starting and speed regulating rheostat A and an electromagnetic switch B, which coöperates with said rheostat in the control of the motor. The armature circuit of the motor extends from one pole of the line switch by conductor 1 through a low resistance coil on the magnet 2 of the switch B, thence to the left hand contact 3 of a resistance R, thence through said resistance to contact segment 4, and thence through the armature to the opposite pole of the switch S by way of conductors 5 and 6. The resistance R is in excess of the amount required for starting the motor. The part $r$, between the contacts 7 and 8, is used for starting purposes, as well as for speed regulation, and the current flows through this portion of the resistance whenever the line switch is closed. The portion $r'$ in excess of the starting resistance, between the contacts 3 and 7, is used in conjunction with the starting resistance only for low speed running, and this portion $r'$ is normally short-circuited through the switch B. The shunt around this portion of the resistance extends from the conductor 1, at the point 9, by way of conductor $1^a$ to the bracket 10 of the switch B, thence through contact arm 11 to a contact member 12, which is normally engaged by said arm 11, and thence by conductor $1^b$ to the dividing point in the resistance at the contact 7. The switch B comprises an armature 13, which is pivoted between its ends on a support 14, said support being mounted upon a metal base 15 between the series magnet 2 and a high resistance magnet 16. One arm $13^a$ of the armature 13 is normally held adjacent the pole of the series magnet by a spring 17, while the opposite arm of the armature is rocked away from the pole of the magnet 16. This latter arm carries a contact 18 adapted, when the armature is moved toward the magnet 16, to engage the end $11^a$ of the contact arm 11 and rock the latter, about its fulcrum on the bracket 10, so as to break the shunt connection around the part $r'$ of the armature resistance between the member 11 and the contact 12. The engagement of the armature 13 with the arm 11 also establishes an electrical connection between said armature and arm, and this electrical connection, it will be noted, takes place an instant before the circuit is opened between the arm 11 and contact 12. A regulating arm 19, which is manually adjustable over the armature resistance contacts to control the speed of the motor, is normally out of the armature circuit but is included in this circuit when the armature 13 rocks into engagement with the arm 11, the circuit through the regulating arm extending from the conductor 1 at the point 9, through conductor $1^a$, bracket 10, contact arm 11, armature 13, armature support 14, and conductor 20 to the arm 19, thence to the armature resistance contact on which the arm is set, and through the resistance at the right of said arm to the motor armature.

The high resistance or constant potential coil 16 of the electromagnetic switch is connected at one side by conductor 21, through a dead resistance 22 and a switch 23, to one pole of the supply circuit switch S, and at the other side the said coil is connected by conductor 24 to the conductor $1^a$, which connects with conductor 1, leading to the opposite side of the supply circuit switch. The switch 23 is normally closed and hence, when the switch S is closed, the coil 16 of the magnetic switch will be energized. A shunt circuit 25 is provided around the terminals of the coil 16, which shunt circuit is normally open, but may be closed when desired by means of a push button switch 26. The closure of this latter switch will shunt the current around the magnetic coil and deënergize the magnet.

Contact bars 27 and 28 are arranged concentrically with the contacts of the armature resistance, and the controller arm 19 is provided with a brush 29, insulated from the arm, adapted to engage and electrically connect the contact bars 27 and 28. The bar 27 is shorter than the bar 28, and at the right hand end of the bar 27 are arranged the contact points 30 of a field resistance $r^2$, which contact points are adapted to be engaged by the brush 29 when the controlling arm 19 is swung to the right beyond the contacts of the armature resistance. The field resistance $r^2$ is connected to the bar 27, as shown, and the shunt field winding $f$ of the motor is also connected to said bar by a conductor 31. From said bar a conductor 32 leads to the contact 33, which is normally engaged by the rocking switch arm 11, so that when said arm is in engagement with the contact 33 the current for the shunt field may flow from one side of the main switch S, through conductors 1 and $1^a$ to the support 10 and switch arm 11, thence through contact 28, conductor 32, bar 27 and conductor 31 to the field, and thence through conductor 6 to the opposite pole of the main switch. Thus, the field resistance $r^2$ cannot be placed in circuit with the field so long as the contact member 11 engages the stationary member 33, even though the controlling arm 19 be in position to cause the brush 29 to engage the contacts of the field resistance, such as the position indicated by the dotted line V. In other words, with the brush in the latter position, the field resistance is short-circuited through the course just traced, which short circuit will be broken when the arm 11 lifts from the contact 33. The current to the field has another path from the conductor 1, through conductor 34 to the segment 28, thence through brush 29 to segment 27, when the brush is in engagement with said segment, and thence to the field by conductor 31; but if the controller arm be set with the brush in engagement with one of the contacts of the field resistance, as for instance, in the position indicated by the line V, the circuit will extend from the segment 28, through brush 29 to the field resistance, thence to contact 27 and to the field by way of conductor 31. So long as the contacts 11 and 33 are closed, however, the field resistance will be short-circuited.

The operation of the controller illustrated in Fig. 1 is as follows:

Assuming that the machine which the motor is to operate requires a stronger starting torque, to start it promptly, on the part of the motor than can be developed by passing the armature current through the entire armature resistance, but that the load, when started, may be readily operated by the motor at low speed, with all of said resistance in circuit, and that it is desired to operate the motor at its lowest speed, the controller arm will be placed upon the first contact, 3, of the armature resistance, as shown in the drawing. When the line switch S is closed, both coils of the electromagnetic switch B will be energized, but the armature being normally closer to the series magnet than to the high resistance magnet, and the former being more strongly energized by the armature current, the armature will be held by the series magnet. As the contacts 11—12 are then in closed position, forming a bridge around the excess resistance $r'$, the current for the armature will flow from the line 1, through conductor $1^a$, contacts 11 and 12, conductor $1^b$ to the left hand end of the starting resistance, at the contact 7, thence through said resistance to the contacts 8 and 4 and thence through the motor armature by conductors 5 and 6. The current for the field will flow through two paths, to-wit: from the conductor 1, through conductor 34 to the segment 28, thence through brush 29 to segment 27, and thence through conductor 31 to the field, and through the parallel path from conductor 1, through conductors $1^a$, contacts 11 and 33, conductor 32 to segment 27, and thence through conductor 31 to the field. When the motor has started its load and the current in the armature circuit has fallen to such an extent that the series magnet 2 fails to hold the armature 13 in opposition to the attractive force of the magnet 16, the latter will rock the armature 13 into engagement with the arm 11, and the arm 11 will thereby be rocked out of engagement with the contacts 12 and 33. As soon as the armature 13 engages the arm 11, a circuit is completed from the armature conductor 1, through $1^a$, 10 and 11, to the armature 13, thence through support 14 and conductor 20 to the controller arm 19, which latter is thus included in the armature circuit, and an instant after this inclusion of the arm in said circuit, the contact arm 11 leaves the contact 12, thus interrupting the shunt around the section $r'$ of the resistance, so that, thereafter, the current to the armature will flow through the controller arm 19 and all of the armature resistance, and the motor will operate at low speed. Simultaneously with the opening of the shunt around the part $r'$ of the armature resistance the field circuit through the arm 11 and contact 33 will also be broken, but no function will be performed by this latter operation in the position of the controller arm, which is set for low speed and does not engage the field resistance. The field will therefore receive current from the conductor 1, through conductor 34, segment 28, brush 29, segment 27, and conductor 31. If the controller arm 19 is initially set on any contact of the starting portion $r$ of the resistance, extending from contact 7 to contact 8, when the switch S is closed, and after the starting current has fallen to a predetermined amount, the electromagnetic switch B will operate as before and connect the controller arm 19 into the armature circuit, and simultaneously therewith, or instantly thereafter, the circuit to the left hand end of the starting resistance, at contact 7, through the conductor $1^b$, will be broken at the contacts 11 and 12, so that, thereafter, the armature current will flow through the controller arm and the armature resistance at the right of said arm, if any. If the controller arm rests on the contact 8, the motor will operate at normal speed, and if it rests on the contact 7 or any intermediate contact, the running speed will be below normal. If the controller arm is set so that the brush 29 engages one of the contacts 30 of the field resistance $r^2$, then that portion of the field resistance which is at the left of the brush on the controller arm will be included in the field circuit after the magnetic switch B has closed and this will give a running speed above the normal. If the controller arm is set in the position indicated by the dotted line V, for instance, so that the brush 29 will connect the last contact of the field resistance with the segment 28, all of the field resistance will be included in the field circuit when the switch B operates, and all of the armature resistance will be cut out. Assuming the controller arm to be set in the position indicated by the line V, upon closing the switch S, and until the switch B closes in consequence of the speeding up of the motor and the fall of armature current, the armature will receive current through the arm 11 and contact 12 and the entire starting resistance $r$, while the field will receive current through the arm 11 and contact 33, the field resistance being short-circuited through said contacts which connect the conductors 1 and $1^a$ to the conductor 32, leading to the segment 27, which segment is connected by conductor 31 directly to the field of the motor. As soon as the motor has started and the current in the armature circuit has fallen to a safe predetermined limit, the magnet 2 releases the armature 13, which is attracted by the magnet 16, and the operation of the armature connects the controller arm 19 into the armature circuit, at the same time, causing the arm 11 to leave the contacts 12 and 33, thus interrupting the circuit to the left hand end of the starting resistance $r$ at the contact 12, and interrupting the shunt around the field resistance at the contact 33. Thereafter, the armature will receive its current directly from the controller arm 19 to the contact 4, and the field current will flow from conductor 1, through conductor 34 to segment 28, thence through brush 29 to the right hand contact of the field resistance $r^2$, then through all of said field resistance to the segment 28, and thence by conductor 31 to the motor field. The motor will therefore operate at a speed above the normal, with all of the armature resistance out of circuit and all of the field resistance in circuit.

It will be seen from the foregoing that the current to the armature initially flows through the entire starting resistance upon closure of the supply switch, the excess portion of the resistance being cut out, and that the electro-magnetic switch B, controlled by the armature current, in conjunction with the controller arm 19, operates to cut resistance into the armature circuit if the controller arm be set at the left of the contact 7, or to cut out resistance from said circuit if the controller arm be set at the right of said contact, while if the controller arm be set on the contact 7, the armature resistance in circuit will remain unchanged, all of the starting resistance $r$ being retained in circuit, while all of the excess resistance $r'$ will be excluded.

If at any time while the motor is in operation with the controller arm set at any point to the right of the first contact 7 of the starting resistance, for a speed above or below the normal, or for normal speed, and it is desired to slow down the motor, this may be done by closing the push button switch 26, which completes the shunt circuit 25 around the magnet 16, and upon the closure of this push button, said magnet will be deënergized and the magnet 2 will rock the armature 13 to normal position, thereby breaking the circuit to the controller arm 19 and reëstablishing the circuit to the left hand end of the starting resistance through the arm 11, contact 12, and conductor $1^b$, at the same time causing the shunt around the field resistance to be established between the contacts 11 and 33. The motor will then run with full field and all of the starting resistance $r$ in circuit. The same change from a higher to a lower speed may be accomplished by opening the switch 23, which interrupts the circuit through the magnet coil 16; but ordinarily, this switch 23 will remain closed and the push button switch will be used for slow down purposes.

The controller shown in Fig. 2, intended for larger motors than the previously described controller, is provided with two electromagnetic switches similar to the electromagnetic switch of Fig. 1, and the starting resistance and field resistance are divided so that these resistances may be cut out in two steps by said switches, coöperating with the controller arm when the latter is set in position for running at high speed. The electromagnetic switch B' performs the same functions as the electromagnetic switch of Fig. 1, but maintains normally a shunt around only one part of the field resistance, while the switch $B^2$ maintains normally a shunt around the entire field resistance. The controller is provided with a segmental contact 35, on the left side of the panel, through which the circuit of the potential coil $16^a$ of the switch B' is made up when the controller arm is at the left of the center of the panel, and in this position of the controller arm the switch B' is operative in the same manner as the switch B of Fig. 1, while the switch $B^2$ is inoperative. The controller is provided also with a segmental contact 36, on the right of the panel, and when the controller arm is moved to the right so that the brush thereon engages this contact, the circuit through the coil $16^a$ of the switch B' is interrupted and the circuit through the potential coil $16^b$ of the switch $B^2$ is made, so that the latter switch becomes operative. When the switch $B^2$ operates, it cuts out one section of the starting resistance and opens a shunt circuit around the entire field resistance and also establishes a circuit through the potential coil $16^a$ of the magnetic switch B', so that the latter may, thereafter, perform its function of connecting the controller arm into the armature circuit and of opening the circuit to the first contact of the starting resistance and the circuit to the intermediate portion of the field resistance, so that the current to the armature and field will thereafter flow through the regulator arm and brush thereon, respectively. The controller is also provided with a switch for slowing down the motor, while running, in one or several steps, according to the position of the controller arm.

Referring more particularly to the circuits of Fig. 2, the armature circuit proceeds from one pole of the supply circuit switch S, by conductor 1, through the coils 2 of the switches $B^2$ and B', in series, to the point 9, and thence to the left hand contact 3 of the armature resistance; thence through said resistance to contact 4 and conductor 5, thence through the armature $a$ to the conductor 6 which leads to the opposite pole of the switch S. At the point 9, a conductor $1^a$ leads from conductor 1 to the supports 10 of both of the electro-magnetic switches, thus connecting the rocking arms $11^b$ and $11^c$ of said switches with the armature circuit. From the contact $12^a$ of the switch B', which is normally engaged by the rocking arm $11^b$, the conductor $1^b$ leads to the contact 7 of the armature resistance which may be considered the first contact point of the starting portion $r$ of said resistance. From the support $14^a$ of the switch B', the conductor 20 leads to the controller arm 19, and from the support $14^b$ of the switch $B^2$, a conductor 37 leads to an intermediate contact of the starting resistance. From the contact $33^a$ of the switch B', which is normally engaged by the rocking arm $11^b$, a conductor $32^b$ leads to an intermediate contact 39 of the field resistance $r^2$. From the contact $33^b$ of the switch $B^2$, which is normally engaged by the rocking arm $11^c$, a conductor 40 leads directly to the field coil $f$ of the motor, and it is also connected by conductor 41 to the segment 27 of the controller, to which the field resistance is connected, as shown. The segment 28 of the controller is connected to the armature conductor 1, as shown at 42. The brush 29ª on the controller arm is adapted to engage the segments 27 and 28 and the contacts of the field resistance, the same as in Fig. 1, (these segments and contacts being shown reversed in position in Fig. 2) and the brush 29ª is also adapted to engage the segmental contact 35 when the controller arm is set at the left of the center of the panel, for low running speeds, and to engage the contact 36 when said arm is set at the right of the center of the panel for higher running speeds. Through these last mentioned contacts the brush on the controller makes up the circuits for the potential coils of the magnetic switches. Thus, when the controller arm is at the left of the center of the controller and the brush 29ª engages the segment 35 and also the segments 27 and 28, the circuit through the potential coil 16ª of the switch B' extends from one side of the supply switch S, through conductor 1 and connection 42 to the segment 28, thence through brush 29ª to the segment 35, thence by conductor 43, through the coil 16ª and dead resistance 44 to contact 45 of switch 46, and thence to conductor 6 and to the opposite side of the supply switch S. A branch conductor 43ª is joined to the conductor 43 at the point 43ᵇ, and extends to a contact 43ᶜ, adjacent the rocking arm 11ᶜ of the switch B², out of contact therewith but adapted to be engaged thereby when said arm is rocked by the operation of the switch. The segment 36 on the controller is connected by conductors 47 and 48 to the potential coil 16ᵇ of the switch B², and from said coil the circuit extends by conductors 49 and 50, through a dead resistance 51 to the contact 52 of switch 46, and thence by conductors 43 and 6 to the supply switch. It will be evident from the course of the conductors to the potential magnets of the switches just traced, that when the brush on the controller arm engages the contact 35 the circuit for the potential magnet 16ª will be completed through said brush and contact, while the circuit through the potential coil 16ᵇ of the switch B² will be open; also, that when the controller arm is moved so that the brush thereon engages the segmental contact 36, the circuit through the coil 16ª will be broken and the circuit through the coil 16ᵇ will be completed through the brush. It will also be evident that in the left hand position of the controller arm, the switch B' will be operative and the switch B² will be inoperative, and that when the controller arm is set in the right hand position the electromagnetic switch B² will be rendered operative and the switch B' will be rendered inoperative until the switch B² is actuated, when the rocking arm 11ᶜ will complete another circuit to the potential coil 16ª through said arm and the contact 43ᶜ, the current to the coil 16ª then flowing through conductors 1 and 1ª to the arm 11ᶜ, thence through contact 43ᶜ and conductor 43ª to the point 43ᵇ, where the latter conductor joins conductor 43, thence by conductor 43 through the coil 16ª, the dead resistance 44 and the switch 46 to conductors 43 and 6 leading to the supply switch. Thus, when the controller arm is set for low running speed, the switch B' alone operates, whereas, when the controller arm is set for high running speeds the switch B² operates, and this, in turn, controls the operation of the switch B'.

Assuming the controller arm to be set in the position shown in full lines, engaging the first contact 3 of the armature resistance, so as to include all of said resistance in the armature circuit, for very low running speed, upon the closing of the supply switch S, the armature current will flow through the series coils of both of the electromagnetic switches, and the coil 16ª of the switch B' will also be energized as the brush 29ª is in engagement with the segment 35, while the potential coil 16ᵇ of the switch B² will not be energized. Hence, initially, the armature current will flow through conductors 1 and 1ª, arm 11ᵇ and conductor 1ᵇ to the first contact 7 of the starting resistance, and through the entire starting resistance to the motor armature. The entire field resistance will remain short-circuited through the engagement of the arm 11ᶜ with the contact 33ᵇ of the switch B. When the motor has started and the armature current has fallen to a safe pre-determined quantity the series magnet of the switch B' will weaken and be over-powered by the potential magnet 16ª, and the armature 13ᵇ will swing toward the latter magnet and rock the contact arm 11ᵇ out of engagement with its contacts 12ª and 33ª and said armature will, at the moment of engagement with the rocking arm, complete a circuit from conductors 1 and 1ª, through said arm and armature and conductor 20, to the controller arm 19, thus connecting the latter in the armature circuit. The rocking of the arm 11ᵇ away from the contact 12ª interrupts the initial course of the current to the contact 7, and thereafter the armature current flows through the controller arm, causing the motor to run at very low speed in the assumed position of said arm. The disengagement of the lever 11ᵇ with the contact 33ª performs no function in this position of the controlling lever, since the field resistance is entirely short-circuited through two other paths, to-wit: through the rocking arm 11ᶜ and contact 33ᵇ, as previously explained, and through brush 29ᵃ from segment 27 to segment 28 and conductors 41 and 40. If the controlling lever is moved to the position indicated by the line X, wherein its brush 29ᵃ still engages the segment 35, the operation will be as before except that a lesser amount of armature resistance will be retained in circuit with the armature when the controller arm is connected in said circuit, and the initial course of the current is interrupted between the lever 11ᵇ and contact 12ᵃ. If the controller arm is moved to the position indicated by the broken line Y, the part of the armature resistance to the right of said line will be retained in circuit after the motor is running, but no field resistance will be included in the field circuit. In this position of the controller arm, the circuit through the potential coil 16ᵃ of the magnetic switch B' is broken and the circuit previously traced through the potential coil 16ᵇ of the magnetic switch B² is made up through the brush 29ᵃ and segment 36. Hence, upon closing the supply switch, current will flow to the armature initially through conductors 1 and 1ᵃ, arm 11ᵇ and contact 12ᵃ of switch B', conductor 1ᵇ to the first contact 7 of the starting resistance and thence through said resistance to the armature and the opposite side of the supply circuit. The current will flow to the field from conductor 1 and segment 28, through brush 29ᵃ to segment 27, and thence through conductors 41 and 40. The series coils of both electromagnetic switches will be energized, but the potential coil of the switch B² only will be energized. The acceleration of the motor will weaken the series magnets of the switches and when the armature current falls, owing to the acceleration of the motor, to a pre-determined extent, the armature 13ᶜ of the switch B² will be rocked into engagement with the arm 11ᶜ, thus completing the circuit from the conductor 1, at the point 9, through conductor 1ᵃ, arm 11ᶜ and armature 13ᶜ to the support 14ᵇ, and thence through conductor 37 to the intermediate contact 38 of the starting resistance, thus cutting out that portion of said resistance between the contacts 38 and 7. When the switch B² operates, the arm 11ᶜ will rock away from the contact 33ᵇ and open the shunt around the field resistance, but no function will be performed thereby in the assumed position of the controlling lever. The arm 11ᶜ will also engage the contact 43ᶜ, and this will establish a circuit through the potential coil 16ᵃ of the switch B', this circuit being established immediately after the cutting out of the operation of the armature resistance, which latter operation results in a temporary increase in the armature current, and this increased current flowing through the series coil of the switch B', prevents said switch from operating at the time when the circuit is established through this potential coil. The circuit of the potential coil 16ᵃ, established by the switch B², extends from conductors 1 and 1ᵃ to rocking arm 11ᶜ, thence through contact 43ᶜ and conductor 43ᵃ to point 43ᵇ, thence by conductor 43 through coil 16ᵃ, dead resistance 44 and switch 46 to conductor 6, and thence to the supply switch. With further acceleration of the motor, the armature current again falls to a pre-determined limit at which the switch B' operates, and when the latter switch operates, the controller arm 19 is connected into the armature circuit by the engagement of the armature 13ᵇ with the arm 11ᵇ. That portion of the starting resistance between the contacts 38 and 8 is thereby cut out. The armature current then flows from line 1, through 1ᵃ to arm 11ᵇ, and thence from armature 13ᵇ, through conductor 20 to the controller arm, thence through that part of the armature resistance at the right of contact 8, and thence to the motor armature. Instantly, after the establishment of a circuit through the controller arm, the movement of the arm 11ᵇ from the contact 12ᵃ breaks the circuit to the first contact 7 of the starting resistance, and also the movement of said arm away from the contact 33ᵃ breaks the circuit extending from said contact to the intermediate point of the field resistance, but no function is performed by opening this connection to the field resistance as the field, in this assumed position of the controller arm, receives current directly from line 1, through contacts 27 and 28, and brush 29ᵃ and conductors 41 and 40. If the controller arm is set for the highest running speed of the motor, in the position indicated by the broken line Z, the starting resistance in the armature will be cut out in two steps and the field resistance will also be cut out in two steps. In this assumed position of the controller arm, the switches B² and B' operate in succession in the same manner as if the controller arm were in the position Y, or any other position at the right of the panel where the brush 29ᵃ engages the segment 36, but the field connections controlled by the electro-magnetic switches will be operated to cut out successive portions of the field resistance. Thus, assuming the controller arm to be in the position Z, upon the closure of the supply switch, the armature will initially receive current through the switch B', and all of the starting resistance and the field resistance will be short-circuited through the lever 11ᶜ and contact 33ᵇ of switch B², which connect the line 1ᵃ with the conductor 40, leading to the field. As the motor accelerates, the switch B² first operates, cutting out the section of armature resistance between the contacts 7 and 38, also opening the circuit just traced to the field and closing the circuit through the potential magnet 16ª of the switch B'. When the switch B² operates, that portion of the field resistance to the right of the contact 39 is included in the field resistance, the current to the field then flowing from conductors 1 and 1ª, through switch B' and conductor 32ᵇ to the contact point 39 of the field resistance, thence through that portion of said resistance between said latter contact and the segment 27, and thence by conductors 41 and 40 to the field. After the temporary rise in armature current, which results from cutting out a section of the armature resistance and cutting in a section of the field resistance, the armature current again falls to a point where the switch B' may operate. Upon the operation of the switch B' the controller arm is connected into the armature circuit through said switch, thus cutting out the balance of the armature resistance, and the movement of the arm 11ᵇ away from the contact 33ª breaks the connection to the intermediate point 39 of the field resistance so that, thereafter, the field current flows from conductor 1 and contact segment 28, through brush 29ª to the right hand contact 50 of the field resistance, thence through all of said resistance to segment 27, and thence through conductors 41 and 42 to the field. In this assumed position of the controller arm the motor will operate at its highest speed.

It is desirable, at times, with certain classes of machinery, driven by the motor, such as printing presses, to be able, from a distant point, to slow down the motor without stopping it, and to have it return automatically to the same speed as before. This is accomplished in the present invention without moving the controller arm, by providing switches through the medium of which the potential magnets of the electromagnetic switches may be deënergized. Thus, between the conductors 48 and 49, connected to the terminals of the magnet 16ᵇ, are arranged push button switches 51. If the controller arm is in position to cause the potential magnet 16ᵇ to be energized, the closing of either one of these push button switches will short-circuit said potential magnet, and hence, the series magnet will return the armature 13ᶜ to normal position. This will cause the arm 11ᶜ to close on the contact 33ᵇ and short-circuit the field resistance, and it will also cause an interruption of the circuit through the coil of magnet 16ª, between the arm 11ᶜ and contact 43ᶜ. The magnet 2 of switch B' will then attract the armature 13ᵇ, releasing the arm 11ᵇ and thereby this circuit through the controller arm will be broken and the circuit to the first contact 7 of the starting resistance will be established, so that the motor will run with the full starting resistance in series with the armature and without external resistance in its field. Upon release of the push button 51, the magnet 16ᵇ of the electromagnetic switch B² will again be energized and the switch B' will then operate in succession as before to connect in the controller arm and to cut out the armature and field resistances.

If, while the controller arm is in the position Z, the switch 46 is moved out of engagement with the contact 45, to interrupt the circuit through the coil 16ª of the switch B', said latter switch will operate to break the connection to the controller arm and establish connection to the intermediate field resistance contact 39. The armature current will then flow through switch B² to an intermediate portion of the armature resistance at the contact 38, and the field current will flow to an intermediate portion of the field resistance, from switch B', through conductor 32ᵇ to the contact 39, and thus a part of the field resistance and a part of the armature resistance will be included in the circuit, slowing down the motor. If the switch 46 is moved farther to the left, off of the contact 52, the circuit through the coil 16ᵇ of the switch B² will be interrupted and said switch will operate to break the armature connection to the contact 38 of the armature resistance and will establish a short circuit around the field resistance through conductor 40. Thereafter, the current will flow directly to the field and through switch B' and conductor 1ᵇ to the first contact 7 of the armature resistance, giving a still lower speed for the motor. If the controller arm is at the left of the center so that the brush engages the segment 35 and one of the push buttons 51 is operated, no reduction in speed will take place as in this position of the controller arm the switch B² is inoperative, but if the switch 46 is moved out of engagement with the contact 45, the coil 16ª of switch B' will be deënergized and in consequence the controller arm will be cut out of the armature circuit and the armature current will flow directly to the first contact 7 of the resistance through the switch arm 11ᵇ, contact 12ª and conductor 1ᵇ, which will result in lowering the speed if the controller arm has been set on the line X, or in increasing the speed if the controller arm has been set, as shown in full lines, upon the contact 3. Of course, however, if the controller arm has been set to give the lowest speed, or any speed below that determined by the inclusion in the armature circuit of the entire armature resistance, the slow-down switches would not be used.

What I claim is:

1. The combination with an electric motor and an armature circuit therefor including a normally closed switch and a resistance, of a speed regulating member adjustable at will on said resistance and normally excluded from the armature circuit, and means for automatically connecting said member into the armature circuit and then opening said switch.

2. The combination with an electric motor and an armature circuit therefor including a normally closed switch and a resistance, of a speed regulating member adjustable at will on said resistance and normally excluded from the armature circuit, and means controlled by the armature current for automatically connecting said member into the armature circuit and then opening said switch.

3. The combination with an electric motor, an armature circuit therefor including a starting resistance, and an additional armature resistance, the latter normally short-circuited, of a speed regulating member adjustable at will over both of said resistances and normally excluded from the armature circuit, and means for automatically connecting said member into the armature circuit and for breaking the shunt around the additional resistance.

4. The combination with an electric motor, an armature circuit therefor including a starting resistance, and an additional armature resistance, the latter normally short-circuited, of a speed regulating member adjustable at will over both of said resistances and normally excluded from the armature circuit, and means controlled by the armature current for automatically connecting said member into the armature circuit and for breaking the shunt around the additional resistance.

5. The combination with an electric motor, an armature circuit therefor including a normally closed switch and a starting resistance, and an additional armature resistance, of a speed regulating member adjustable at will over both of said resistances and normally excluded from the armature circuit, and means for automatically connecting said member into the armature circuit and for opening said switch.

6. The combination with an electric motor, an armature circuit therefor including a normally closed switch and a starting resistance, and an additional armature resistance, of a speed regulating member adjustable at will over both of said resistances and normally excluded from the armature circuit, and means controlled by the armature current for automatically connecting said member into the armature circuit and for opening said switch.

7. The combination with an electric motor, and an armature circuit therefor including a starting resistance, of a speed regulating member adjustable at will on said resistance and normally excluded from the armature circuit, means adapted to automatically cut out one portion of said resistance, and means, controlled by said first mentioned means, for including said member in the armature circuit.

8. The combination with an electric motor, and an armature circuit therefor including a starting resistance, of a speed regulating member adjustable at will on said resistance and normally excluded from the armature circuit, an electromagnetic switch for connecting said member in the armature circuit, and means associated with said member for controlling the operation of said switch.

9. The combination with an electric motor, and an armature circuit therefor including a starting resistance, of a speed regulating member adjustable at will on said resistance from low to high speed positions and vice versa and normally excluded from the armature circuit, an electromagnetic switch for connecting said member in the armature circuit, an electromagnetic switch for cutting out a portion of the armature resistance, and means associated with said member for causing the operation of said first mentioned switch only, in the low speed positions of said member, and for causing the operation of said second mentioned switch in the higher speed positions of said member, and means controlled by said latter switch for causing the operation of said first mentioned switch.

10. In a controller for electric motors, a resistance for the armature circuit, a speed-controlling member manually adjustable on said resistance, but normally excluded from the armature circuit, an electromagnetic switch for connecting said member in said circuit, an electromagnetic switch for cutting out a portion of said resistance, control circuits for said switches, and means adjustable with said member for completing said latter circuits.

11. In a controller for electric motors, a resistance for the armature circuit, a speed-controlling member manually adjustable on said resistance from low to high speed positions and vice versa, but normally excluded from the armature circuit, an electromagnetic switch for connecting said member in said circuit, an electromagnetic switch for cutting out a portion of said resistance, control circuits for said switches, and means controlled by said member for rendering the control circuit of said first mentioned switch, only, operative when said member is set for low speeds, and for rendering the control circuits of the second mentioned switch and the first mentioned switch successively operative when said member is set for higher speeds.

12. The combination with an electric motor, a resistance for the armature circuit thereof and a speed-controlling member normally excluded from said circuit and manually adjustable on said resistance, of a switch for connecting said member in said circuit after the motor has started, a magnet for operating said switch, and manually operated means, independent of said member, for deënergizing said magnet, without stopping the motor, to change the speed of the latter.

13. The combination with an electric motor, a resistance for the armature circuit thereof and a speed-controlling member normally excluded from said circuit and manually adjustable on said resistance, of a switch for connecting said member in said circuit after the motor has started, a switch for cutting out part of said resistance, magnets for operating said switches, and manually controlled means, independent of said member, for deënergizing said magnets, without stopping the motor, to change the speed of the latter.

14. The combination with an electric motor and an armature circuit therefor including a resistance, a rocking switch-arm normally shunting a portion of the resistance, a speed regulating member adjustable at will on said resistance and normally excluded from the armature circuit, a rocking armature adapted to engage said switch-arm and connect said member in said circuit and to move said arm to open the shunt around the aforesaid portion of the resistance, and electromagnetic means for operatitng said armature.

15. The combination with an electric motor and an armature circuit therefor including a resistance, a rocking switch-arm normally shunting a portion of the resistance, a speed regulating member adjustable at will on said resistance and normally excluded from the armature circuit, a rocking armature adapted to engage said switch-arm and connect said member in said circuit and to move said arm to open the shunt around the aforesaid portion of the resistance, and a pair of magnets for operating said rocking armature, one of said magnets having windings in series with the armature.

16. The combination with an electric motor and an armature circuit therefor including a resistance, a rocking switch-arm normally shunting a portion of the resistance, a speed regulating member adjustable at will on said resistance and normally excluded from the armature circuit, a rocking armature adapted to engage said switch-arm and connect said member in said circuit and to move said arm to open the shunt around the aforesaid portion of the resistance, a pair of magnets for operating said rocking armature, one of said magnets having windings in the armature circuit, and means associated with said speed regulating member for completing a circuit through the coils of the other magnet.

17. The combination with an electric motor having an armature and a shunt wound field, of resistance for the armature circuit and resistance for the field circuit, means for supplying current to the motor at starting with the first resistance included in the armature circuit, and with the second resistance excluded from the field circuit, a manually movable regulating member adjustable over both of said resistances, to give pre-set running speeds below or above normal, and means for automatically cutting resistance out of the armature circuit and by the same operation inserting resistance in the field circuit, when said member is set for a speed above the normal running speed.

18. The combination with an electric motor having an armature and a shunt wound field, of resistance for the armature circuit and resistance for the field circuit, means for supplying current to the motor at starting with the first resistance included in the armature circuit, and with the second resistance excluded from the field circuit, a manually movable regulating member adjustable over both of said resistances, to give pre-set running speeds below or above normal, and means controlled by the armature current for successively cutting sections of resistance out of the armature circuit and simultaneously inserting sections of resistance in the field circuit when said member is set for a speed above the normal running speed.

In testimony whereof I have affixed my signature.

GEORGE H. WHITTINGHAM.

Copies of this patent may be obtained for five cents each, by addressing the "Commissioner of Patents, Washington, D. C."